United States Patent
Sontag et al.

(10) Patent No.: US 9,635,185 B2
(45) Date of Patent: *Apr. 25, 2017

(54) METHOD FOR IMPROVING CONNECTION SUCCESS AND DEVELOPING MEDIA ASSETS IN CONNECTION WITH ARRANGING VIDEO CHAT AMONG CANDIDATE CONVERSANTS

(71) Applicants: James Luke Sontag, Portland, OR (US); Robert Angelo DiFalco, Portland, OR (US); Joel Gregg Norvell, Portland, OR (US)

(72) Inventors: James Luke Sontag, Portland, OR (US); Robert Angelo DiFalco, Portland, OR (US); Joel Gregg Norvell, Portland, OR (US)

(73) Assignee: Wai LLC, Portland, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/077,158

(22) Filed: Mar. 22, 2016

(65) Prior Publication Data
US 2016/0205257 A1 Jul. 14, 2016

Related U.S. Application Data

(63) Continuation-in-part of application No. 14/532,968, filed on Nov. 4, 2014, now abandoned, and a
(Continued)

(51) Int. Cl.
*H04N 7/14* (2006.01)
*H04M 3/56* (2006.01)
(Continued)

(52) U.S. Cl.
CPC .......... *H04M 3/563* (2013.01); *H04L 65/403* (2013.01); *H04M 3/2218* (2013.01);
(Continued)

(58) Field of Classification Search
USPC .................. 348/14.06, 14.08, 14.09, 211.12; 379/93.21, 158, 202.01, 205.01
See application file for complete search history.

(56) References Cited

U.S. PATENT DOCUMENTS

| 6,038,543 A * | 3/2000 | Kurosawa | G06Q 10/06311 705/1.1 |
| 2004/0172456 A1 * | 9/2004 | Green | G06Q 10/107 709/207 |

(Continued)

*Primary Examiner* — Yosef K Laekemariam
(74) *Attorney, Agent, or Firm* — Mersenne Law

(57) ABSTRACT

A system registers participant information and inter-participant relationship information, and then, at variable times, selects two or more participants with a pre-existing relationship and attempts to establish a communication link between them. At least one of the participants is notified that the communication link will be attempted, shortly before the attempt is made. The identities of the selected participants are withheld from at least one of the participants (and potentially from all of the participants), so the call is a partial surprise (i.e., the participant may know the set of possible people from whom the call could be, but does not know exactly which person or people are calling until he answers the call). A number of applications are described and claimed.

20 Claims, 5 Drawing Sheets

Related U.S. Application Data continuation-in-part of application No. 13/954,872, filed on Jul. 30, 2013, said application No. 14/532,968 is a continuation-in-part of application No. 13/954,872, filed on Jul. 30, 2013.

(51) Int. Cl.
  *H04M 3/22*    (2006.01)
  *H04M 3/42*    (2006.01)
  *H04M 7/00*    (2006.01)
  *H04L 29/06*   (2006.01)
  *H04M 3/432*   (2006.01)
  *H04N 7/15*    (2006.01)

(52) U.S. Cl.
  CPC ... *H04M 3/42008* (2013.01); *H04M 3/42221* (2013.01); *H04M 3/432* (2013.01); *H04M 7/006* (2013.01); *H04N 7/147* (2013.01); *H04N 7/15* (2013.01)

(56) References Cited

U.S. PATENT DOCUMENTS

| | | | | |
|---|---|---|---|---|
| 2005/0101291 A1* | 5/2005 | Scalisi | H04M 3/42 | 455/406 |
| 2009/0281840 A1* | 11/2009 | Hersch | G06Q 40/00 | 705/4 |
| 2014/0200039 A1* | 7/2014 | Fuisz | H04M 19/04 | 455/458 |

* cited by examiner

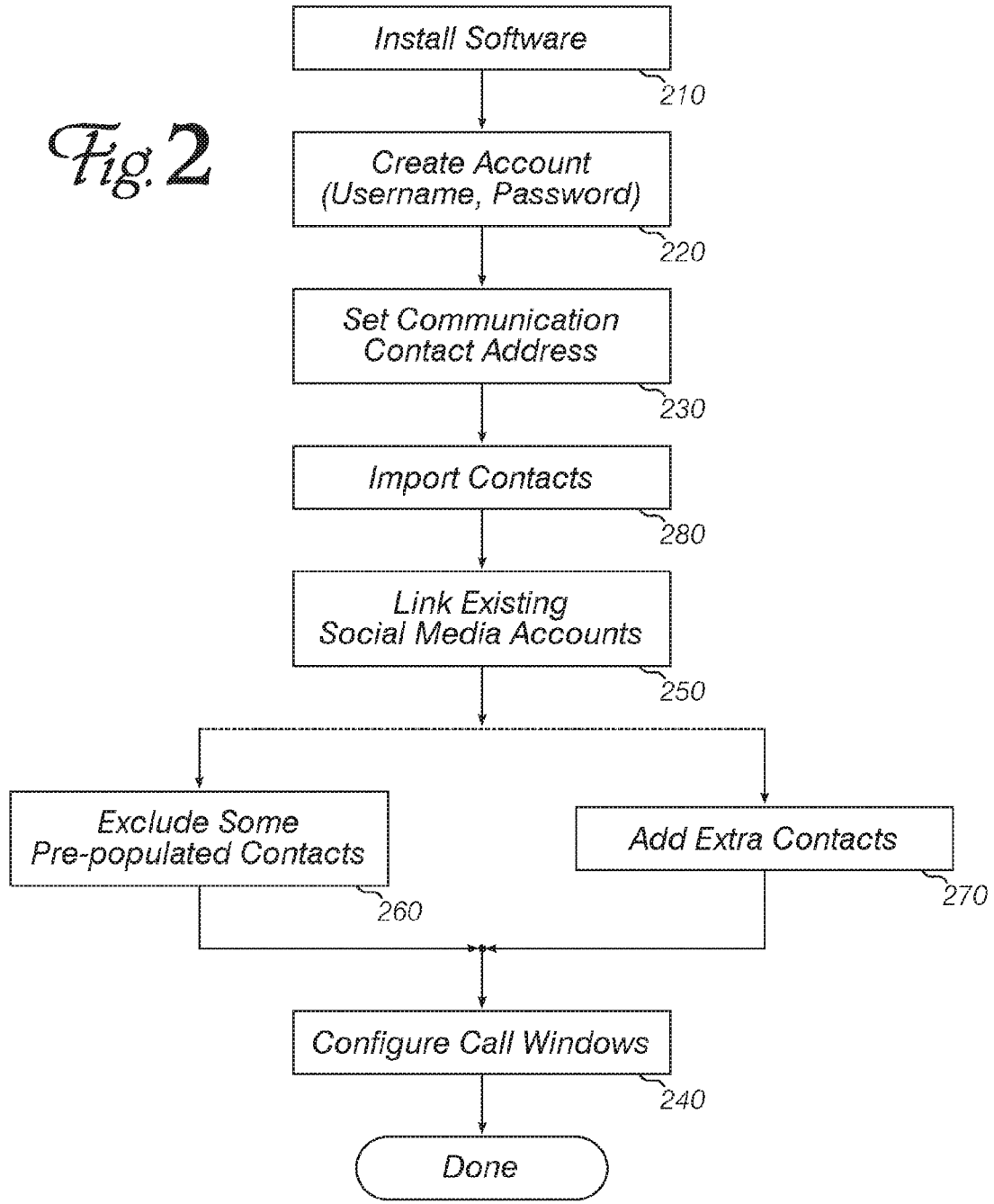

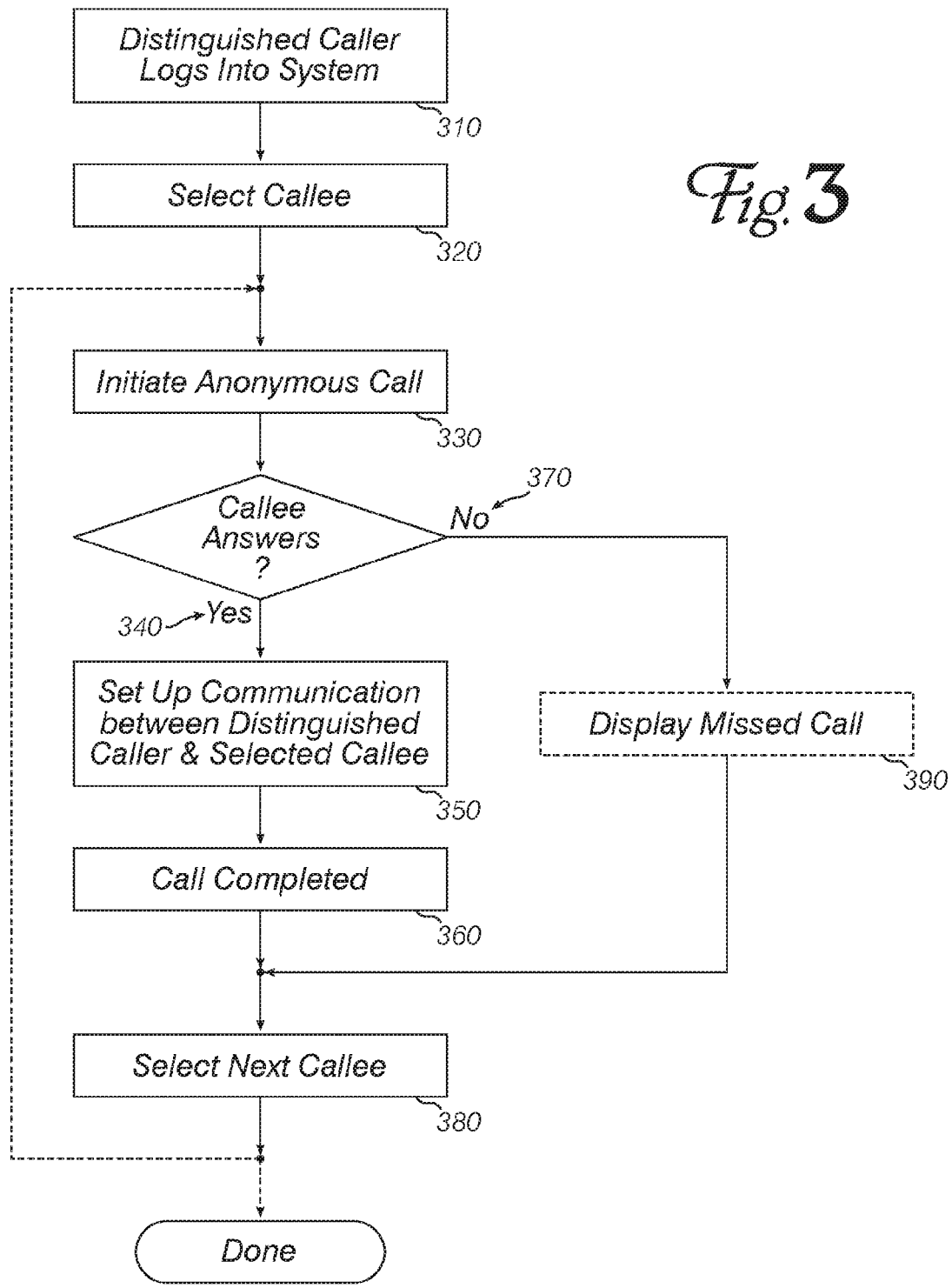

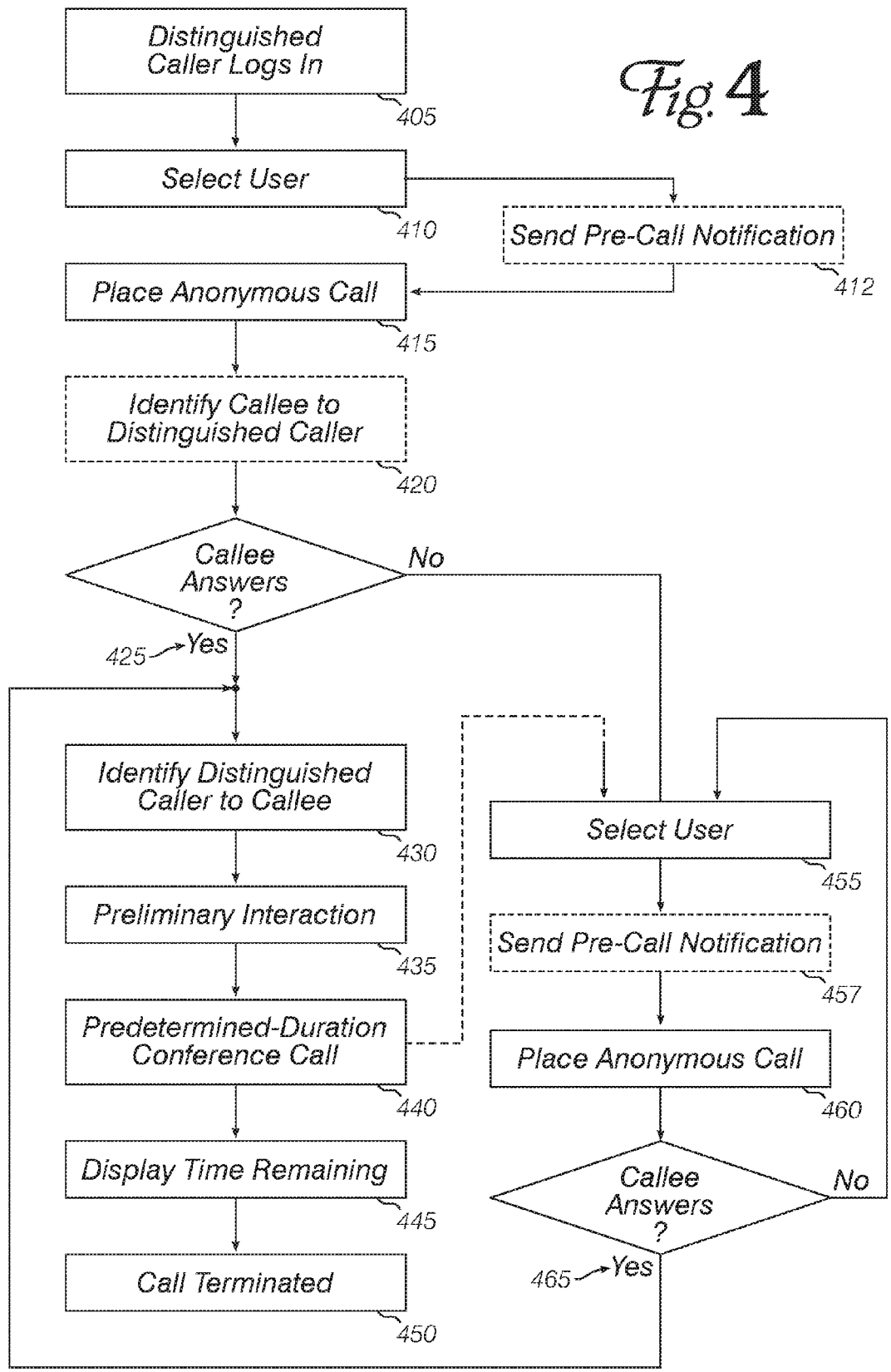

METHOD FOR IMPROVING CONNECTION SUCCESS AND DEVELOPING MEDIA ASSETS IN CONNECTION WITH ARRANGING VIDEO CHAT AMONG CANDIDATE CONVERSANTS

CONTINUITY AND CLAIM OF PRIORITY

This is a U.S. continuation-in-part patent application that claims priority to co-pending application Ser. No. 13/954,872 filed 30 Jul. 2013 and Ser. No. 14/532,968 filed 4 Nov. 2014.

FIELD

The invention relates to special services in telephonic communication. More specifically, the invention relates to improvements to a multimedia telephonic communication system where semi-anonymous calls are automatically established for business, networking, recreational or amusement purposes.

BACKGROUND

Ubiquitous and increasingly-connected mobile computing devices combine with social media services such as Google, Facebook, Twitter and Pinterest to produce an environment that gives social scientists pause. Some researchers worry that the latest advances in the digital realm make real-time conversation unnecessary, and as a result, people are less connected than ever. Since people can (and do) exchange information through Short Message Service ("SMS") text messages ("texting"), Facebook status updates, "tweets," and similar methods, traditional face-to-face interactions (as well as intermediate-engagement means like telephone conversations) are less common. Instead of truly catching up with a friend or relative, we simply write "Happy Birthday" on their Facebook wall. Technology allows us to communicate with little or no engagement, and as a result we are both more connected and more alone.

Author, scientist and professor Sherry Turkle captured this phenomenon succinctly in the title of her book, Alone Together. She argues that information exchange via text or tweet is not an adequate substitute for real-time conversation and engagement. Research by psychology professor Barbara Fredrickson suggests that people's social skills atrophy through disuse, in a manner at least conceptually similar to the loss of physical strength that accompanies a sedentary lifestyle.

Services and technological methods that facilitate engagement by encouraging real-time, face-to-face conversations may help stave off "social atrophy" by deepening relationships. Social media technologies, smart phones and video-chat functions can be leveraged to provide valuable support for neglected aspects of public and private life.

SUMMARY

Embodiments of the invention offer telephone, videophone or similar connections at predetermined times between two or more parties having a pre-existing social relationship, without disclosing the identity of the other party (or parties) to at least one of the offerees. If two or more of the offerees accept the proposed connection, a voice, voice-and-video or similar telecommunication connection is established so that the accepting offerees can communicate. The improvements described and claimed herein can significantly increase the success rate for telecommunication connection establishment. Some embodiments record portions of the call for analysis, troubleshooting, training and/or advertising purposes.

BRIEF DESCRIPTION OF DRAWINGS

Embodiments of the invention are illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

FIG. 2 is a flow chart outlining a registration and configuration process.

FIG. 3 is a flow chart outlining operations of another embodiment of the invention.

FIG. 4 is a flow chart outlining another set of operations according to an embodiment.

DETAILED DESCRIPTION

A system implementing an embodiment of the invention will mine contacts from various social-media technologies and algorithmically pair them together for a voice or video call at a predetermined time during the day. Each user will have control over which of her friends are candidates for pairing, and she can decide to either ignore or accept the call. Users will not know with whom they are being connected until they decide to accept the conversation. As a result, no one will know if you decide to ignore a call. Software implementing the functionality can operate exclusively on mobile computing devices such as cell phones, or portions of the functionality can be distributed between end-user devices and a central networked server.

Figure 1A:
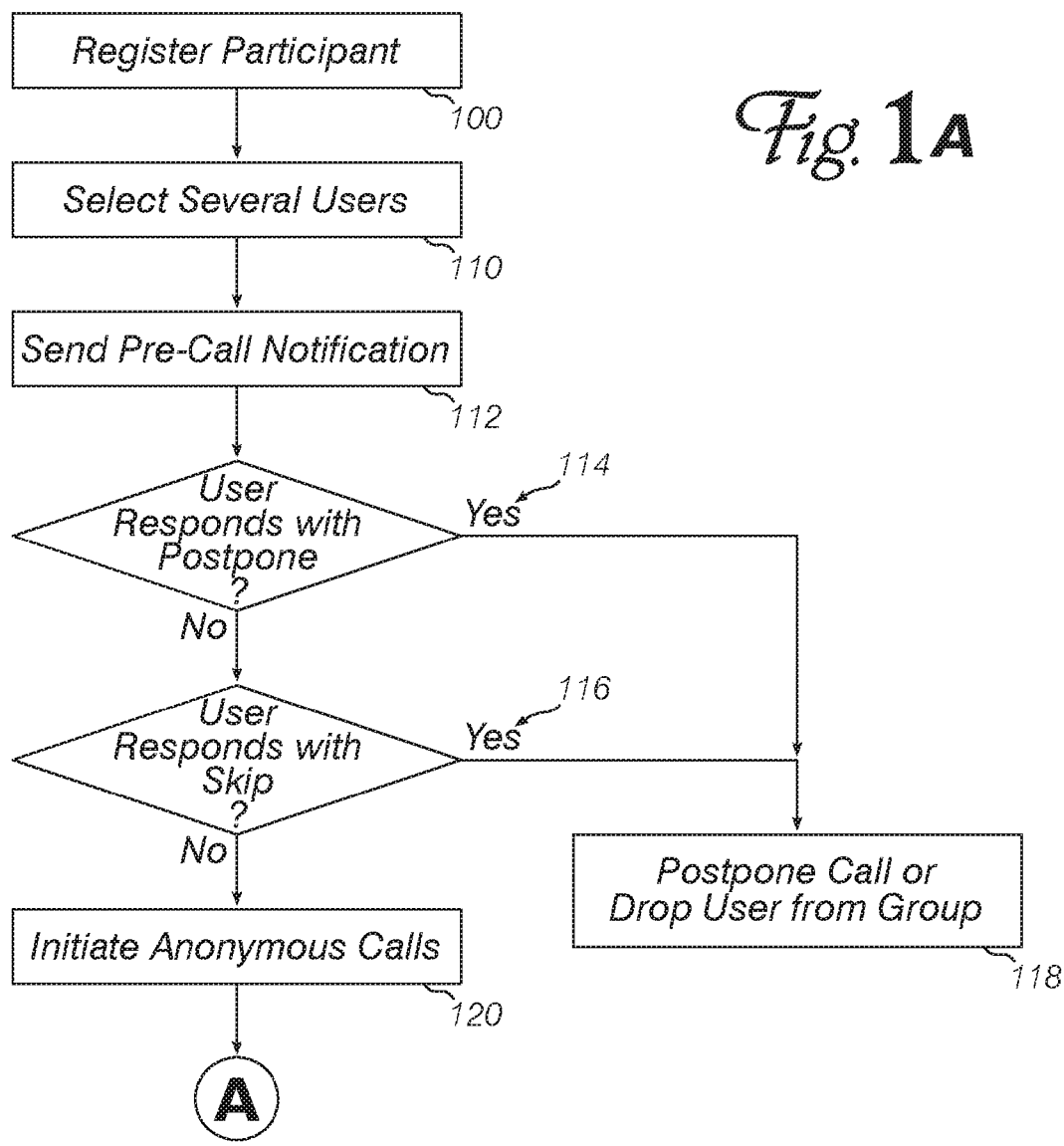
FIGS. 1A and 1B are a flow chart outlining operations of an embodiment of the invention.
Figure 1B:
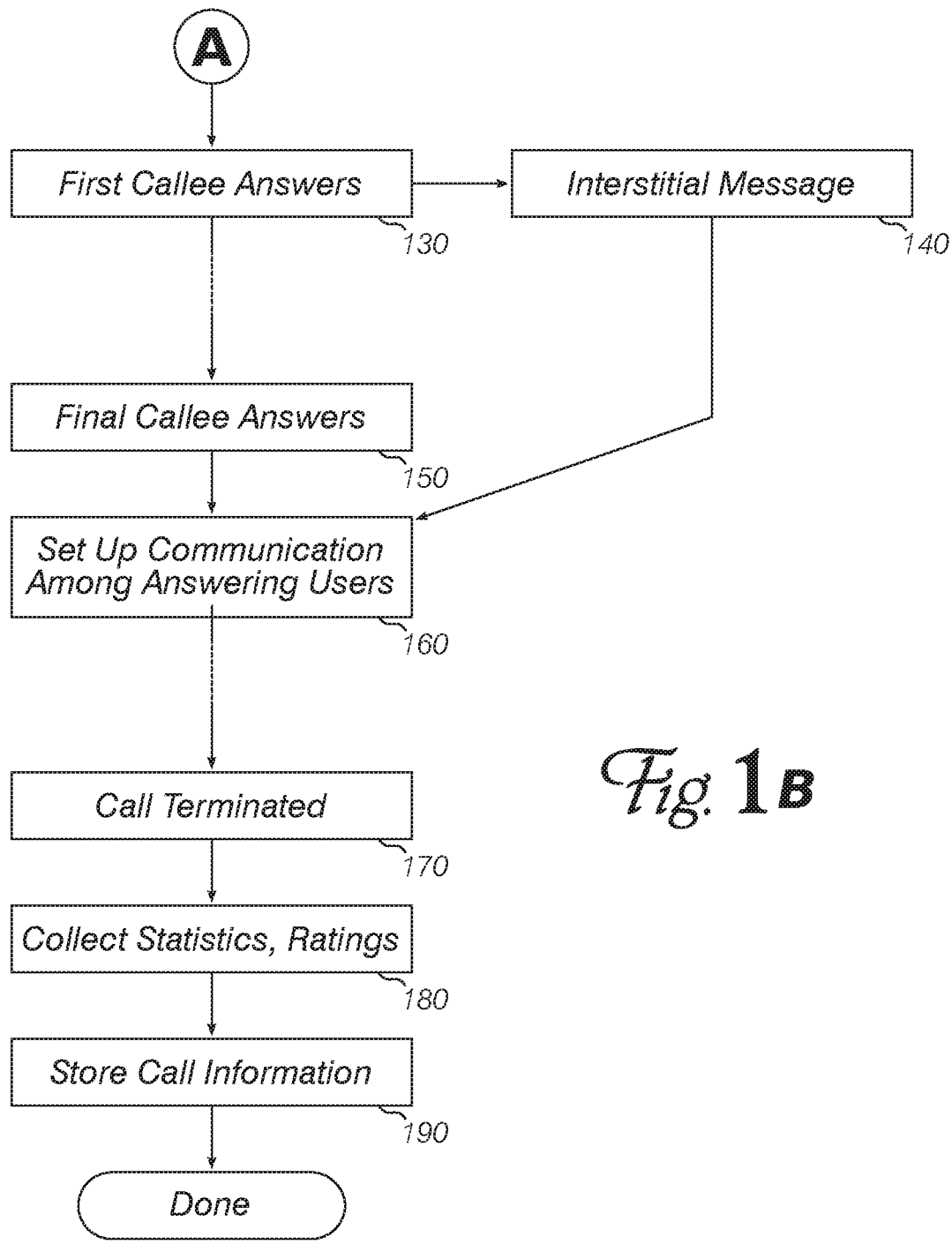

FIG. 1 outlines actions and events that occur during the operation of an embodiment of the invention. First, participants are registered (100). Embodiments only need a few pieces of information from each participant (chiefly, one or more telecommunication-capable addresses such as phone numbers, and relationship information to allow groups of participants to be identified as being friends, acquaintances, members of a common social group such as a church or club, etc.) An embodiment may conduct open or rolling registrations, accepting new participants at any time. A large or numerous membership is preferred as it allows greater flexibility in subsequent operations.

At predetermined times, the system selects several users having a preexisting relationship (110). At least two users must be selected, but more may be selected. The selection process takes into account group membership (e.g., friends or co-workers), the users' "available" times (i.e., to avoid attempting calls to a person who is likely to be busy or asleep), and the previous experiences reported by people who have spoken with the user (e.g., a new user may be matched with an experienced user whose friends have reported having enjoyable "surprise" conversations).

For at least one of the selected users, the system transmits a pre-call notification to the user (112). For example, an automated voice call or a text message may be sent, alerting the user that the system will shortly attempt to initiate an anonymous call. This pre-call notification gives the user time to wrap up current tasks or to prepare for a short break. If the user will be unable to accept the call (e.g. the timing or environment is inconvenient), she may respond to the pre-call notification with a request to postpone for a short time (114) or to skip the call entirely (116). If such a response is received, the system may adjust (e.g., postpone) the scheduled call, or remove the notified person from the group of users (118).

For each remaining selected user, the system initiates a telecommunication connection (e.g., a phone call) to the user (120). The call may be identifiable as coming from the system operator, but it should withhold the identity of at least one of the other selected users, from at least one of the called parties. In a preferred embodiment, none of the called parties should be able to determine the identity of any of the other parties. Some embodiments may (silently) establish a data connection to a selected user's mobile device to determine whether the user is currently busy with a phone call. Selected users who are already engaged in a call may be dropped from the selected group before the telecommunication connection is initiated.

Although all the calls may be initiated at about the same time, it is likely that the callees will not all answer simultaneously. Thus, when the first callee answers (130), the system may play an interstitial message for him (140) while waiting for the other (or for another) callee to answer. An embodiment may be configured to proceed when one other selected callee answers, or only when two or more additional callees have answered. In the latter case, similar interstitial messages may be played for other callees who have answered, before the threshold number of users is reached. In some embodiments, all answering callees will receive an interstitial message before being placed in conference with the other user(s). The interstitial message(s) may be, for example, advertisements (including sound and/or video, interactive games, and so on).

Eventually, a final callee answers (150), and the system sets up a communication channel among all the answering callees (160). For example, a teleconference bridge (or videoconference bridge) may be established. At this point, the participants in the call all learn the identities of the other participants and can speak with each other. If other call attempts are still in progress, they may be abandoned at this point, or the remaining callees may be joined to the conference bridge if they answer while the call is in progress.

The communication channel may be maintained for a predetermined time (e.g., for three minutes after establishment), or for so long as the participants care to continue speaking with each other. An embodiment may provide a count-down warning preceding the disconnection of the conference bridge, or may simply monitor the bridge to detect when no more than one participant remains connected. After the call is terminated (170) (or as each participant disconnects), the system collects information about that participant's involvement (180): the time between call initiation and that participant's acceptance of the call, any interstitial messages played for the participant, the duration of the participant's involvement, whether the participant left the call early, and so on. A participant may also be asked to rate the call on criteria such as his enjoyment of the conversation with the other participants, his satisfaction with the frequency of calls to that person (or to those people), or with the frequency of calls to people in that group of acquaintances. This information may be stored (190) to improve the system's selection of users for subsequent calls.

The user-registration process may proceed as outlined in FIG. 2. First, software to perform portions of the overall method is installed on the new user's mobile device (i.e., cell phone or tablet computer) (210). It is appreciated that embodiments of the invention operate in a broader distributed-computing environment, and many portions of the methods can be accomplished by software running at different locations. However, it is preferable that at least some operations be performed by software executing on a computing device that is in the user's possession—such an arrangement makes available data, such as Global Positioning System ("GPS") location data, that is useful to other portions of the system.

The new user creates a system account by, for example, selecting a new username and setting a password (220). An embodiment of the invention may be integrated with an existing social media service, in which case the user's username and password for the service may be re-used here. The user provides a communication contact address (which may be automatically extracted from the mobile device) (230).

Next, the new user's contacts are imported (240). For example, names and phone numbers from the user's telephone database may be copied into the system's records. Other social-media services may be linked (250), and the user's contacts on those services may also be copied.

The user may wish to exclude certain pre-populated contacts from subsequent operations (260), or add additional contacts who are not in the user's telephone directory or social-media "friend" lists (270). Finally, the user may set "Call Windows:" days and/or times during which he is willing to accept calls from the system (280). If no such days or times are set, the system may limit contact attempts to "reasonable" values such as 9:00 a.m. to 10:00 p.m. on weekdays. Call (or "Contact") windows allow users to prevent the system from attempting to initiate a surprise anonymous call at a time that would be inconvenient for the user. The pre-call notification discussed above is another way the system can avoid inconveniencing the user, and has been found to significantly increase the number of successful (connected) surprise/anonymous calls. Contact lists, active times and other settings may be changed at any time, either through the mobile-device software interface or through an associated website.

Although a principal application of an embodiment is to arrange unexpected phone calls among groups of friends, acquaintances, co-workers, church members, or others with pre-existing social relationships, these systems can also set up "surprise" calls from a celebrity, musician or sports figure to a fan of that person. For example, in connection with the release of a new motion picture, an actor may participate in a promotion wherein the actor uses the "random, anonymous call" features of the system to contact registered users who have expressed interest in receiving such a call. Preferably, the called user would be unable to distinguish such a call from an ordinary automatically-arranged call from a member of his social network, until he answers the call and learns the identity of the other party. This is a special case of the "distinguished caller" embodiment, whose operations are outlined in FIG. 3.

The distinguished caller identifies himself to the system by logging in with a username and password, or by some similar procedure (310). This indicates that the distinguished user is available to participate in automatically-connected, semi-anonymous "surprise" calls to other system users who have previously expressed interest in receiving such calls. The system selects one or more such users at random (320) and initiates telecommunication connections to him/them (330). As in other embodiments, the identity of the other party to the call (in this case, the distinguished caller) is withheld from the called party until the callee accepts the call.

If the callee answers (340), he has the opportunity to participate in a direct phone or video call with the distinguished caller (350). After the call (360) (or if the callee does not answer (370)), the system may move on to the next randomly-selected callee (380). As in other embodiments, the system may record information about the call duration or the callee's impression of the call after it is completed.

Most embodiments do not provide any information about the identities of the parties to a call before the call is accepted or after an unanswered call attempt, but a "distinguished caller" embodiment may display a "Missed Call from [Distinguished Caller's Name]" message on the selected callee's phone (390) if the callee declines the call or does not answer.

A "distinguished caller" embodiment is outwardly similar to other embodiments, especially from the perspective of the callee who is offered an opportunity to speak with the distinguished caller. However, operations of these embodiments may be tuned to make better use of the distinguished caller's time—after all, the distinguished caller is not in the position of having a serendipitous chance encounter with a friend; instead, he is intentionally connecting with someone (or several people) who wish to speak with him, and is using the facilities of an embodiment in part to avoid the appearance of discrimination or favoritism in selecting the people from a larger population who would appreciate such an opportunity.

For example, consider a politician who wishes to meet and discuss issues one-on-one with her constituents. The traditional "town hall" style of meeting may be unacceptable because of travel or scheduling constraints, and in any case, topics covered at a town hall meeting are often principally those of interest to the most aggressive or outspoken attendees. This politician may use an embodiment of the invention that operates roughly as FIG. 4 outlines:

First, the politician (i.e., distinguished caller) logs into the system (405). Login can be accomplished through a website, via a telephone system, or otherwise. (In one embodiment, the caller's interface to the system is through the same telephone or videophone that she will use to communicate with the callees.)

The system selects a first registered user from among all users who have expressed interest in speaking with the politician, and whose acceptable call windows encompass the current date and/or time (410). A pre-call notification may be sent to this user (412), as this has been found to increase the successful connection ratio, and the politician is interested in making such connections successfully. The system places an anonymous call to the selected user (415) (the callee's name or other identifying information may be provided to the distinguished caller (420)). If the callee answers, 425, then the distinguished caller's identity may be provided to the callee (430), and/or an introductory message, survey question, or other preliminary, automatic interaction may occur (435). Next, the answering callee is placed into conference with the distinguished caller (440). In this embodiment, the call duration is time-limited, so a "remaining time" countdown is displayed to both the distinguished caller and the answering callee (445).

Simultaneously (i.e., while one call is still connected), the system selects another user (455), optionally sends a pre-call notification (457), and then places an anonymous call to him (460). If this callee answers (465), then the distinguished caller is identified (430) and/or a similar preliminary, automatic interaction is started (435). This interaction overlaps in time with the prior, ongoing conversation, so that when the prior conversation ends (450), the distinguished caller can be informed of the next callee's identity and the next call can proceed immediately. If the "overlapped" call is not answered, then the distinguished caller may experience a short delay between calls, as the next answering callee participates in the preliminary interaction.

The foregoing operations may be repeated indefinitely, until all of the possible callees have been contacted or the distinguished caller disconnects from the system.

Embodiments of the invention share many features, such as the automatic call initiation at times acceptable to the recipients and the call anonymity (i.e., some or all call recipients do not learn the identities of the other party or parties unless/until they accept the call). However, embodiments differ in the way that callees are selected for inclusion on a call. In addition, some embodiments may offer participants the ability to fine-tune the selection process. Thus, for example, although the exact time of a system's call and the identity of the person with whom a participant will be placed in conference may be unknown, a participant may be able to set target call frequencies for certain people or groups (e.g., "I'd like to talk to my grandmother twice a week," or "Only call my college friends in the two months before the Homecoming celebration.") Some embodiments may integrate with a user's appointment calendar so that the user will not be selected for a call if another event is scheduled (or a specific time may be set aside on the calendar for random calls—this may merely increase the chance that the system will select the user during the time period, or may be treated like a distinguished-caller scenario—the system may even make several attempts to connect the user with one of his friends or acquaintances during the scheduled time).

Embodiments may also adjust participant selection in response to information collected from previous calls, or based on the lack of information about one of the participants (i.e., the information that the user is new to the system or hasn't participated in many previous calls). A useful goal for tuning participant-selection algorithms is increased enjoyment ratings of the participant at the conclusion of the call. In other words, the system's goal may be to ensure that the callees have a good time speaking with their friends, that they look forward to the surprise calls, and that they accept the calls quickly and often.

In embodiments where the call duration is fixed, the system may offer one or all participants an opportunity to continue the call beyond its normal duration.

The interstitial message (preliminary interaction, etc.) may be chosen by the system on the basis of information available to it at the time of the call (i.e., it may be context-sensitive). For example, if geolocation information about the callees is available and they are near each other, then the interstitial message may provide information about a meeting place such as a café or restaurant—the callees may decide during the call that they'd like to get together in person.

In any of the foregoing embodiments, some or all of the call contents may be recorded by the system operator. For example, if a teleconference or videoconference bridge is established between the callees, an additional port on the bridge may be used to record all participants' voices (and, if available, video or other media). The recorded call content may be useful for post-mortem analysis, for troubleshooting, for customer-service training, or for advertising purposes. In a distinguished-caller embodiment, for example, a studio or producer may use the recorded interactions between an actor and a fan in a marketing campaign for a movie. Or a politician may use material from a question-and-answer interaction with a constituent in his campaign advertising, or to support legislative efforts. Recording calls may also be provided as an add-on service to ordinary (non-distinguished-caller) participants. Recordings may be made as a matter of course, but only provided to participants (or others) upon payment of a service fee.

An embodiment of the invention may be a machine-readable medium (including without limitation a non-transitory machine-readable medium) having stored thereon data and instructions to cause a programmable processor to perform operations as described above. In other embodiments, the operations might be performed by specific hardware components that contain hardwired logic. Those operations might alternatively be performed by any combination of programmed computer components and custom hardware components.

Instructions for a programmable processor may be stored in a form that is directly executable by the processor ("object" or "executable" form), or the instructions may be stored in a human-readable text form called "source code" that can be automatically processed by a development tool commonly known as a "compiler" to produce executable code. Instructions may also be specified as a difference or "delta" from a predetermined version of a basic source code. The delta (also called a "patch") can be used to prepare instructions to implement an embodiment of the invention, starting with a commonly-available source code package that does not contain an embodiment.

In some embodiments, the instructions for a programmable processor may be treated as data and used to modulate a carrier signal, which can subsequently be sent to a remote receiver, where the signal is demodulated to recover the instructions, and the instructions are executed to implement the methods of an embodiment at the remote receiver. In the vernacular, such modulation and transmission are known as "serving" the instructions, while receiving and demodulating are often called "downloading." In other words, one embodiment "serves" (i.e., encodes and sends) the instructions of an embodiment to a client, often over a distributed data network like the Internet. The instructions thus transmitted can be saved on a hard disk or other data storage device at the receiver to create another embodiment of the invention, meeting the description of a machine-readable medium storing data and instructions to perform some of the operations discussed above. Compiling (if necessary) and executing such an embodiment at the receiver may result in the receiver performing operations according to a third embodiment.

In the preceding description, numerous details were set forth. It will be apparent, however, to one skilled in the art, that the present invention may be practiced without some of these specific details. In some instances, well-known structures and devices are shown in block diagram form, rather than in detail, in order to avoid obscuring the present invention.

Some portions of the detailed descriptions may have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the preceding discussion, it is appreciated that throughout the description, discussions utilizing terms such as "processing" or "computing" or "calculating" or "determining" or "displaying" or the like, refer to the action and processes of a computer system or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, including without limitation any type of disk including floppy disks, optical disks, compact disc read-only memory ("CD-ROM"), and magnetic-optical disks, read-only memories (ROMs), random access memories (RAMs), eraseable, programmable read-only memories ("EPROMs"), electrically-eraseable read-only memories ("EEPROMs"), magnetic or optical cards, or any type of media suitable for storing computer instructions.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will be recited in the claims below. In addition, the present invention is not described with reference to any particular programming language. It will be appreciated that a variety of programming languages may be used to implement the teachings of the invention as described herein.

The applications of the present invention have been described largely by reference to specific examples and in terms of particular allocations of functionality to certain hardware and/or software components. However, those of skill in the art will recognize that semi-random, semi-anonymous telecommunication calls can also be arranged and facilitated by software and hardware that distribute the functions of embodiments of this invention differently than herein described. Such variations and implementations are understood to be captured according to the following claims.

We claim:

1. A method performed by a central networked server, comprising:
    receiving participant information from a plurality of individuals, said participant information comprising a communication contact address and an acceptable contact window and recording the participant information at the central networked server;
    selecting at least two individuals from the plurality of individuals, said selection based upon a pre-existing relationship between the at least two individuals and an overlap between the acceptable contact window of each of the at least two individuals; and at a time within the overlap between the acceptable contact windows and shortly after the pre-call notification, initiating a call from the central networked server to each of the at least two individuals, said initiating to withhold an identity of at least one of the at least two individuals from at least another of the at least two individuals until a predetermined time after initiating the call.

2. The method of claim 1 wherein initiating a call to each of the at least two individuals comprises:
dialing telephone numbers for each of the at least two individuals; and
connecting each of the at least two individuals to a telephone bridge among the at least two individuals.

3. The method of claim 1 wherein initiating a call to each of the at least two individuals comprises:
attempting Voice Over Internet Protocol ("VOIP") connections to each of the at least two individuals; and
connecting each successful VOIP connection to a conference bridge among the at least two individuals.

4. The method of claim 1 wherein initiating a call to each of the at least two individuals comprises:
attempting video-conference connections to each of the at least two individuals; and
forwarding voice and video data from each successful video-conference connection to each other successful video-conference connection.

5. The method of claim 1 wherein the participant information comprises social-media identification information.

6. The method of claim 1 wherein an identity of each of the at least two individuals is withheld from all of the other individuals.

7. The method of claim 1 wherein the predetermined time is when at least one of the at least two individuals accepts the call.

8. The method of claim 1 wherein the predetermined time is when at least two of the at least two individuals accept the call.

9. The method of claim 1, further comprising:
recording conversation among the at least two individuals onto a non-transient, tangible medium.

10. A method for producing a recorded conversation among a plurality of users having a pre-existing relationship, said recorded conversation occurring under particular circumstances, the method comprising:
receiving registration information from a plurality of users and recording said registration at a central networked server, said registration information including at least a telecommunications contact address for each user of the plurality of users;
receiving indications from a subset of the plurality of users that the users in the subset would be interested in communicating with a distinguished caller;
beginning a communication session between the central networked server and the distinguished caller;
selecting a first interested user from the subset of the plurality of users;
initiating a telecommunications connection from the central networked server to the first interested user, said initiating to withhold an identity of the distinguished caller from the first interested user until after the first interested user accepts the telecommunications connection;

recording audio during the telecommunications connection between the first interested user and the distinguished caller;
completing the telecommunications connection between the first interested user and the distinguished caller if the first interested user accepts the telecommunications connection; and
terminating the telecommunications connection between the first interested user and the distinguished caller after a predetermined time period elapses.

11. The method of claim 10, further comprising:
transmitting an interstitial message to the first interested user after the first interested user accepts the telecommunications connection and before completing the telecommunications connection between the first interested user and the distinguished caller.

12. The method of claim 10, further comprising:
selecting a second interested user from the subset of the plurality of users; and
initiating a second telecommunications connection to the second interested user, said initiating to withhold the identity of the distinguished caller from the second interested user until after the second interested user accepts the telecommunications connection, said second initiating operation performed after the first interested user accepts the telecommunications connection and before the terminating operation.

13. The method of claim 12, further comprising:
repeating the selecting and initiating operations to establish a succession of telecommunication connections between the distinguished caller and users from the subset of the plurality of users.

14. A non-transitory computer-readable medium containing instructions and data to cause a programmable processor at a central networked server to perform operations comprising:
selecting a plurality of individuals from a database containing contact and relationship information for a larger plurality of individuals;
sending a pre-connection message to at least one of the selected plurality of individuals;
initiating telecommunication connections from the central networked server to each of the selected plurality of individuals;
playing an interstitial message for a first answering individual of the selected plurality of individuals between a time the first answering individual accepts a first telecommunications connection and a time a second answering individual accepts a corresponding second telecommunications connection;
after the second answering individual accepts the corresponding second telecommunications connection, establishing a connected communication channel between the first and second answering individuals;
after a closing of the connected communication channel, recording information about a duration of the connected communication channel at the central networked server.

15. The computer-readable medium of claim 14, containing additional data and instructions to cause the programmable processor to perform operations comprising:
after a closing of the connected communication channel, obtaining a participant rating of a completed communication between the first and second answering individuals from one of the first or second answering individuals; and recording the participant rating of the completed communication.

16. The computer-readable medium of claim 14 wherein the initiating operation withholds identities of other of the selected plurality of individuals from one of the selected plurality of individuals.

17. The computer-readable medium of claim 14 wherein the selecting operation chooses individuals having a preexisting social relationship.

18. The computer-readable medium of claim 14, containing additional data and instructions to cause the programmable processor to perform operations comprising:
   recording audio content in the connected communication channel between the first and second answering individuals; and
   storing the recorded audio content on a non-transitory medium at the central networked server.

19. The method of claim 1, further comprising:
   sending a pre-call notification to at least one of the at least two individuals before initiating the call from the central networked server to each of the at least two individuals.

20. The method of claim 10, further comprising:
   sending a pre-call message from the central networked server to the first interested user before initiating a telecommunications connection from the central networked server to the first interested user.

* * * * *